(12) United States Patent
Ptasinski et al.

(10) Patent No.: US 6,363,437 B1
(45) Date of Patent: Mar. 26, 2002

(54) PLUG AND PLAY I²C SLAVE

(75) Inventors: Kristoffer Ptasinski; Jari Sassi, both of Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/226,166

(22) Filed: Jan. 7, 1999

(51) Int. Cl.[7] ............................................. G06F 13/00
(52) U.S. Cl. .................... 710/10; 710/104; 710/106; 710/109; 710/110; 710/126
(58) Field of Search .................. 710/1–4, 8–13, 710/100–110, 126; 711/103; 381/312

(56) References Cited

U.S. PATENT DOCUMENTS

| | | | | |
|---|---|---|---|---|
| 4,280,221 A | * | 7/1981 | Chun et al. ................... | 375/288 |
| 4,413,319 A | * | 11/1983 | Schultz et al. ............ | 710/229.5 |
| 5,325,532 A | | 6/1994 | Crosswy et al. ............. | 395/700 |
| 5,339,362 A | | 8/1994 | Harris .......................... | 381/86 |
| 5,513,334 A | * | 4/1996 | Alexander ................... | 711/103 |
| 5,630,139 A | * | 5/1997 | Ozaki .......................... | 395/712 |
| 5,668,992 A | | 9/1997 | Hammer et al. ............. | 395/651 |
| 5,752,006 A | * | 5/1998 | Baxter ......................... | 395/500 |
| 5,794,032 A | | 8/1998 | Leyda .......................... | 395/682 |
| 5,799,205 A | * | 8/1998 | Niemann et al. ............ | 381/312 |
| 5,872,934 A | * | 2/1999 | Whitehouse et al. ........ | 710/101 |
| 5,974,475 A | * | 10/1999 | Day et al. ....................... | 710/9 |
| 6,012,013 A | * | 1/2000 | Sartore et al. ................. | 710/8 |
| 6,067,628 A | * | 5/2000 | Krithivas et al. ........... | 713/340 |

FOREIGN PATENT DOCUMENTS

GB 2 195 028 A 3/1988

OTHER PUBLICATIONS

Philips Semiconductors, The I2C–bus and how to use it (including specifications), Apr. 1995, pp. 1–24.
IBM Technical Disclosure Bulletin, "Unconditional Installation of SCSI Device Drivers", Apr. 1994, pp. 153–154.
Standard Search Report dated Apr. 21, 1999.

* cited by examiner

Primary Examiner—Christopher B. Shin
(74) Attorney, Agent, or Firm—Burns, Doane, Swecker & Mathis, L.L.P.

(57) ABSTRACT

In accordance with embodiments of the invention, an electronic device including one or more controllers and one or more slave units is provided with a bus such as an I²C serial bus that connects the controllers and the slave units. The device further includes a secondary memory containing software drivers for a variety of different types of slave units, which can be present on the bus. The controller determines which types of slave units are actually present on the bus by sending, for each type of slave unit represented by a corresponding software driver in the secondary memory, a command via the bus using an address for the type. After determining which types of slave units are present on the bus, the controller loads corresponding software drivers from the secondary memory into a RAM, and using the loaded software drivers to initialize the slave units present on the bus.

23 Claims, 5 Drawing Sheets

I²C communication protocol

I²C communication protocol with a repeated start condition

I²C serial bus timing

Acknowledgement mechanism
in the I²C protocol

Acknowledgement mechanism outlined
in the I²C timing diagram

Code continues

Top-level flowchart
of the device
identification procedure

PLUG AND PLAY I²C SLAVE

FIELD OF THE INVENTION

The present invention relates generally to data communications within a device or system, and in particular to data communications to and from removable components within the device or system via a serial bus.

BACKGROUND OF THE INVENTION

Conventional solutions for implementing data communications within electronic devices and systems, where at least some of the components are removable and exchangeable, are aimed at special products and are not general and easy to adapt to other systems. These conventional solutions often require that specialized hardware be added to standard system configurations to support interchangeability of different components. The additional, specialized hardware can include, for example, an additional bus that is used for identifying modules connected to the system, and non-standard, specially designed modules. These features typically increase both production costs and device complexity.

U.K. Patent Application No. 2 195 028 A, published Mar. 23, 1988, discloses an apparatus for testing electrical circuits that includes a controller to which selected interface modules can be connected, to enhance functionality of the apparatus. The controller can interrogate the connected modules to determine both the physical location of each module within the apparatus, and function and character of each module. With this information the controller can appropriately organize its internal routines. However, the disclosed bus structure of the apparatus has a multiplicity of specialized buses including a parallel module identification bus. Furthermore, the necessary size of the module identification bus varies depending on the number of modules that can be connected to the apparatus.

U.S. Pat. No. 5,339,362 to Harris discloses an automotive audio system having a controller housing into which modular signal processing components can be inserted. A controller in the audio system polls all positions within the controller housing to determine which components are installed, and then configures itself via software to provide appropriate control functions. In the polling process the controller uses an 8-line wide SELECT bus as well as a specific POLL line. Furthermore, the patent disclosure suggests that all software routines for modular components that can be inserted into the system are stored in RAM, regardless of whether the corresponding modular components are actually inserted in the system.

Thus, the conventional solutions demonstrated in U.K. Patent Application No. 2 195 028 A and U.S. Pat. No. 5,339,362 require large and/or multiple parallel buses, non-standard configurations and protocols, and large RAM capacity.

SUMMARY OF THE INVENTION

In accordance with embodiments of the invention, an electronic device including one or more controllers and one or more slave units is provided with an I²C serial bus connecting the controllers and the slave units. The device further includes a secondary memory containing software drivers for a variety of different types of slave units.

The controller determines which types of slave units are present on the bus by sending, for each type of slave unit represented by a corresponding software driver in the secondary memory, a command via the bus using an address for the type. If the controller subsequently receives an acknowledge signal corresponding to the command, then the controller knows that a slave unit of the type indicated by the address is present on the bus. The controller continues sending commands using different addresses, until either a predetermined number of slave units have acknowledged, or until commands corresponding to all of the slave unit types represented by software drivers stored in the secondary memory have been sent.

A corresponding software driver for each slave unit type present on the bus is loaded from the secondary memory into a RAM easily accessed by the controller. The software drivers can be loaded as they are identified, or can be loaded after all slave unit types present on the bus have been determined. The software drivers are used to initialize the slave units present on the bus and to enable the controller to properly coordinate and implement the device functions. Other serial buses and/or bus standards that support individual addressing and acknowledging can be used instead of the I²C bus.

BRIEF DESCRIPTION OF THE DRAWINGS

Other objects and advantages of the invention will become apparent to those skilled in the art from the following detailed description of preferred embodiments, when read in conjunction with the accompanying drawings. Like elements in the drawings have been designated by like reference numerals.

DETAILED DESCRIPTION OF THE INVENTION

In accordance with embodiments of the invention, a standard I²C bus is used to within an electronic device having modular components such as removable slave units, to dynamically determine which slave units are connected to the bus. Software drivers corresponding to those slave units connected to the bus are loaded from a secondary memory into a RAM. Thus, the electronic device can be dynamically configured using a standard bus such as the I²C bus, and using off-the-shelf modular components that are I²C compatible. This allows consumption of RAM to be minimized, as well as reducing production costs by using standard, off-the-shelf technology without additional, specialized hardware. The invention also confers the significant advantage of allowing a manufacturer of a device that incorporates modular components connected by a standard I²C bus, to substitute different modular components during manufacturing without having to alter the device design in any way. This can be particularly useful, for example, because it allows the manufacturer to equip the device with modular components from different vendors depending on component pricing, availability, etc., thus resulting in further reductions in manufacturing costs and in greater flexibility.

The I²C protocol can be used for communicating data within a system having at least one microcomputer and other peripheral devices, e.g., memories and I/O expanders. The I²C protocol is especially useful when the cost of connecting various devices within the system must be minimized, and high speed data transfer is not required.

In particular, the I²C protocol is a two-pin, bidirectional serial protocol that uses a data signal on one pin and a clock signal on the other pin. The protocol is symmetrical with respect to each of the pins, so that the same rules apply to bidirectional transfer of data information through the data pin as apply to bidirectional transfer of clock information through the clock pin. For a more thorough description of the I²C protocol, see, e.g., *The I²C-Bus and How to Use It* (*Including Specifications*), Philips Semiconductors, copyright April 1995, pages 1–24, which is hereby incorporated by reference.

Figure 1:
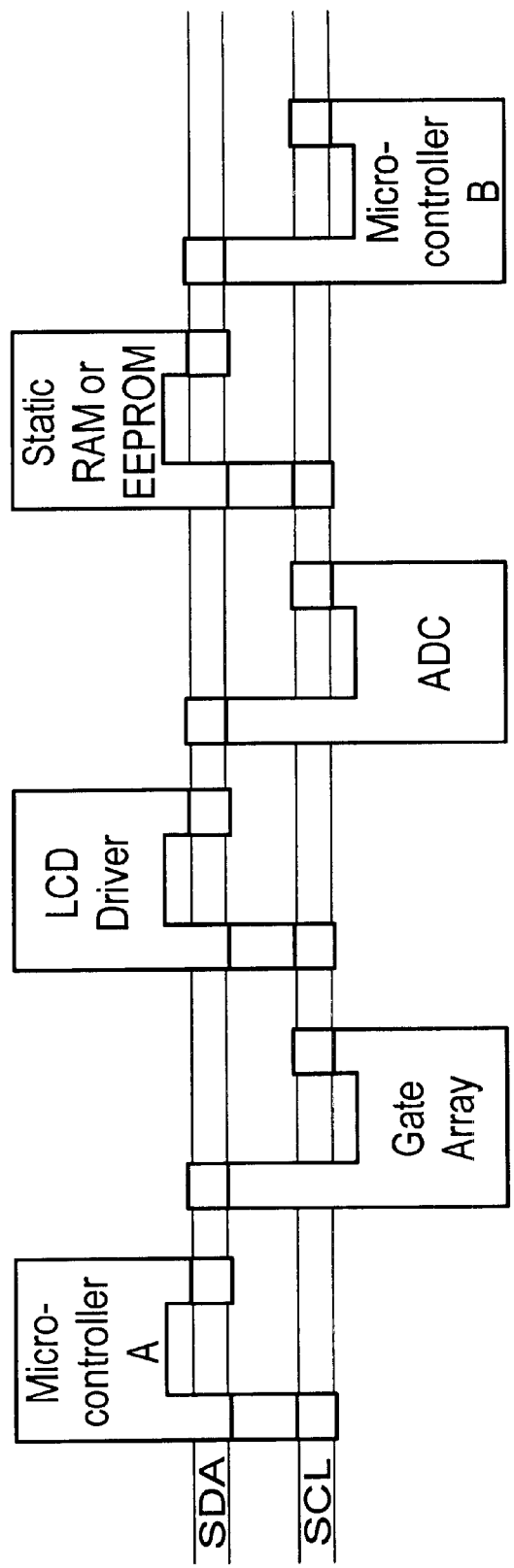
FIG. 1 shows exemplary connections in a device using an I²C bus.
Figure 2:
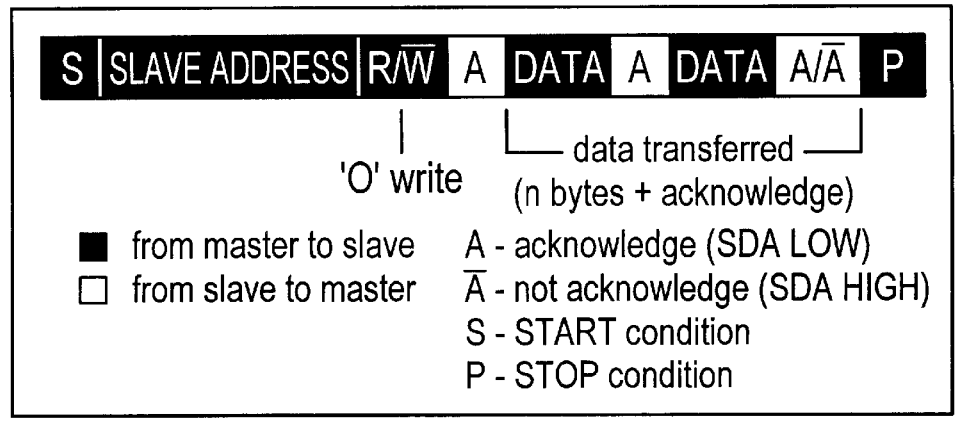
FIG. 2 shows I²C communication protocol.
Figure 3:
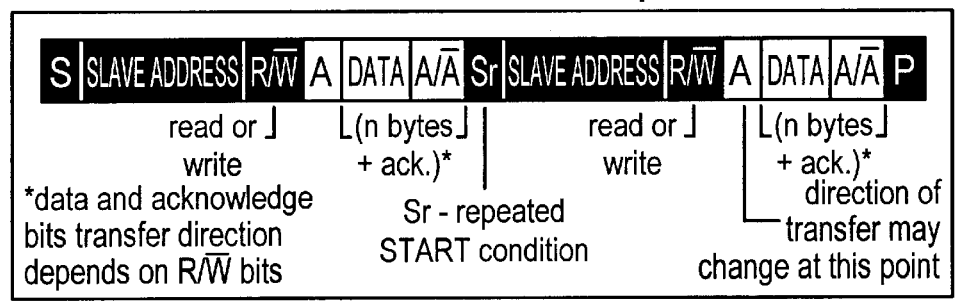
FIG. 3 shows an I²C communication protocol with a repeated start condition.
Figure 4:
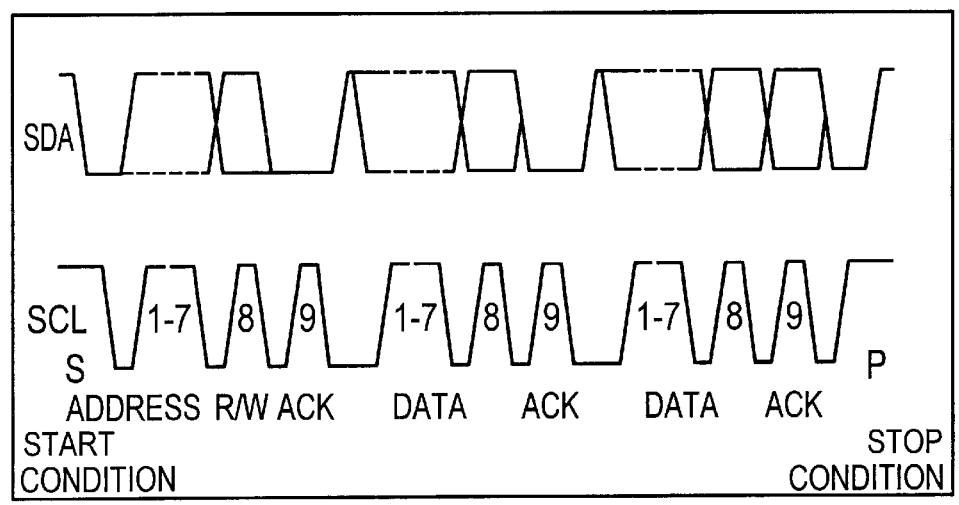
FIG. 4 shows I²C serial bus timing.
Figure 5:
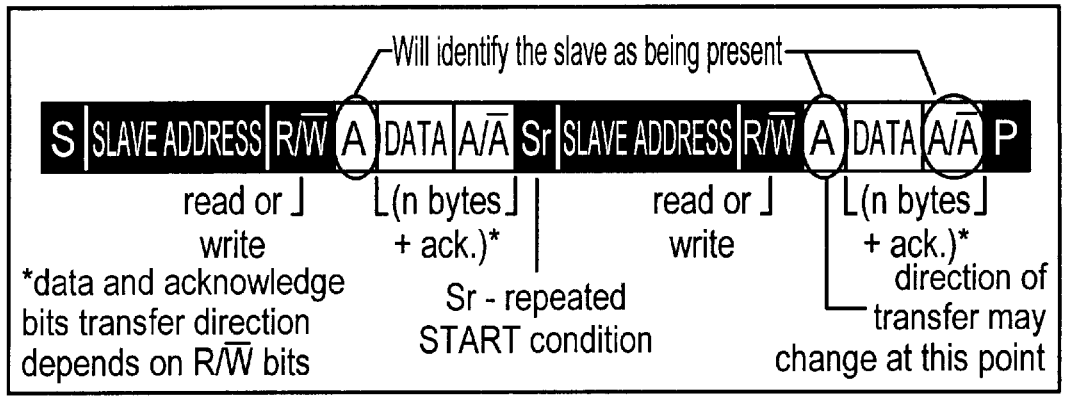
FIG. 5 shows an acknowledgment mechanism in accordance with the I²C protocol.
Figure 6:
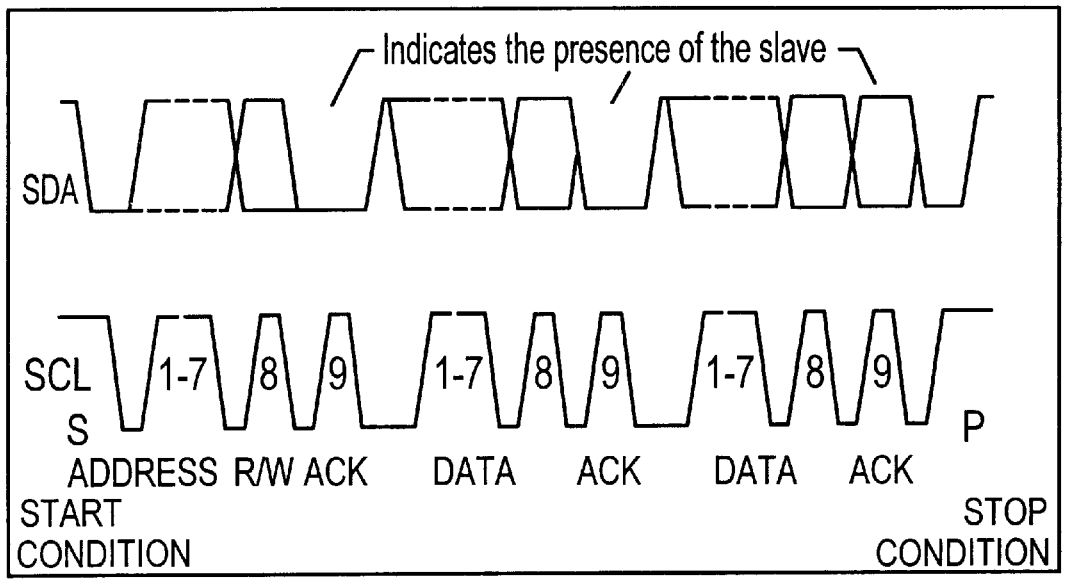
FIG. 6 shows an acknowledgment mechanism outlined in an I²C timing diagram.

As shown in FIGS. 5 and 6, an Acknowledge signal put onto the bus by a slave unit in response to a command on the bus including an address for the slave unit, can be used to indicate that the slave unit is present on the bus. A system incorporating exemplary embodiments of the invention must be aware of which devices or slave units can be accepted within the system. This can be done, for example, directly in the software code provided for the controller within the system. Alternatively, the controller can be provided with a configuration file that will be evaluated when the software code for the controller is run, for example when the system is powered up. As outlined in the Philips specification for the I²C standard, the I²C standard requires that each slave on the bus respond to a unique address, and indicates that an I²C-bus Committee coordinates allocation of unique I²C addresses. In accordance with different embodiments of the invention, slave units present on an I²C bus must be recognized or identified, and then initialized and/or operated using appropriate software drivers.

Figure 7A:
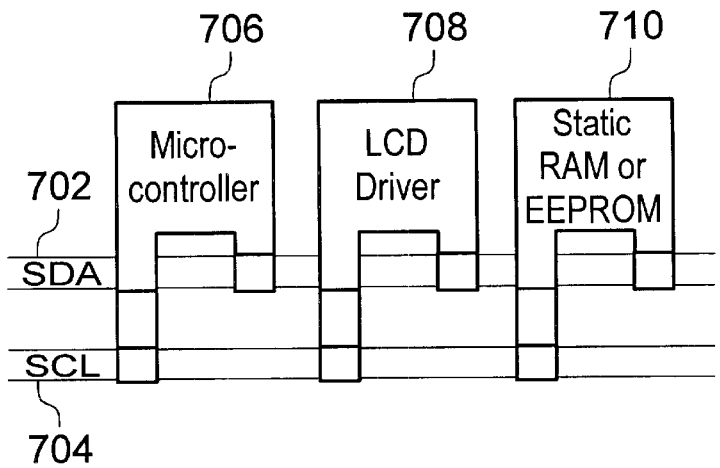
FIG. 7A shows a device configuration in accordance with an embodiment of the invention.
Figure 7B:
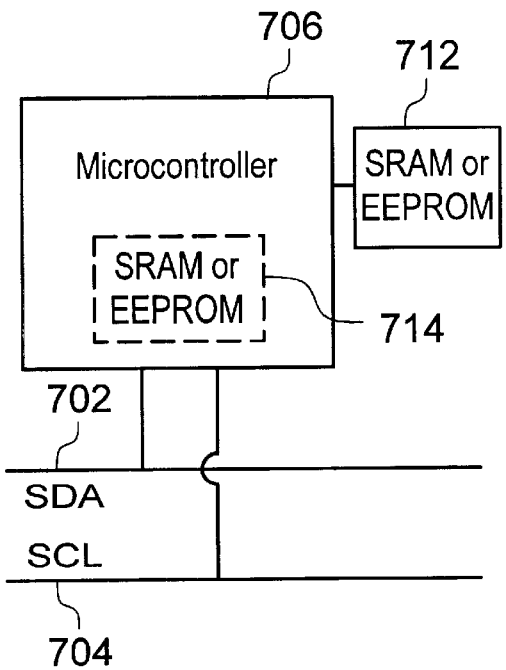
FIG. 7B shows a device configuration in accordance with another embodiment of the invention.

As shown in FIG. 7, in accordance with an embodiment of the invention incorporated within an electronic device, software drivers for all I²C slave units that can be used within the device (in accordance with the particular function and application of the device) are stored in a secondary memory 710. The secondary memory 710 can be, for example, an SRAM, an EEPROM, or any other suitable memory that can, for example, maintain its contents without an external power source. As shown in FIG. 7A, an exemplary device incorporating an embodiment of the invention includes a controller or microcontroller 706 and a slave unit such as an LCD driver 708. Alternatively, as shown in FIG. 7B, the secondary memory can be provided within the microcontroller 706, as secondary memory 714, or can be provided external to, but directly connected to, the microcontroller 706, as secondary memory 712.

Figure 8:
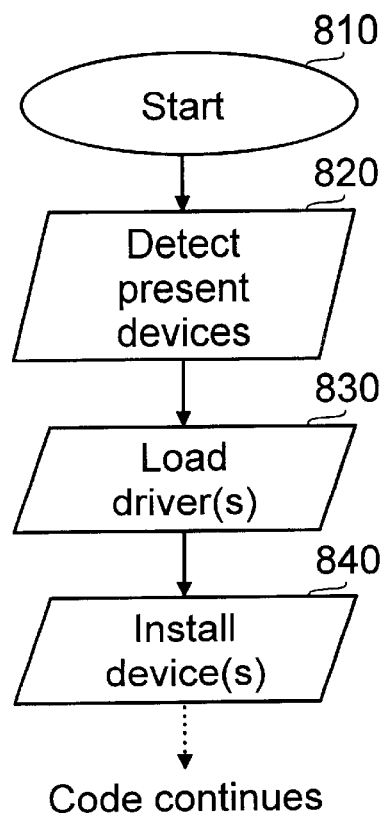
FIG. 8 shows a flowchart of a device identification procedure in accordance with an embodiment of the invention.

FIG. 8 shows a flowchart describing the general function of an embodiment of the invention. After starting at step 810, in step 820 all slave units present on the bus are detected. This step can be performed, for example, by the microcontroller 706. In step 840, software drivers corresponding to all of the slave units determined to be present on the bus are loaded, for example into a RAM located within the microcontroller 706 or directly connected to the microcontroller 706. In step 850, the loaded software drivers are used to initialize the slave units present on the bus. After the slave units are initialized, the device incorporating the bus and the slave units proceeds with its characteristic functions.

Figure 9:
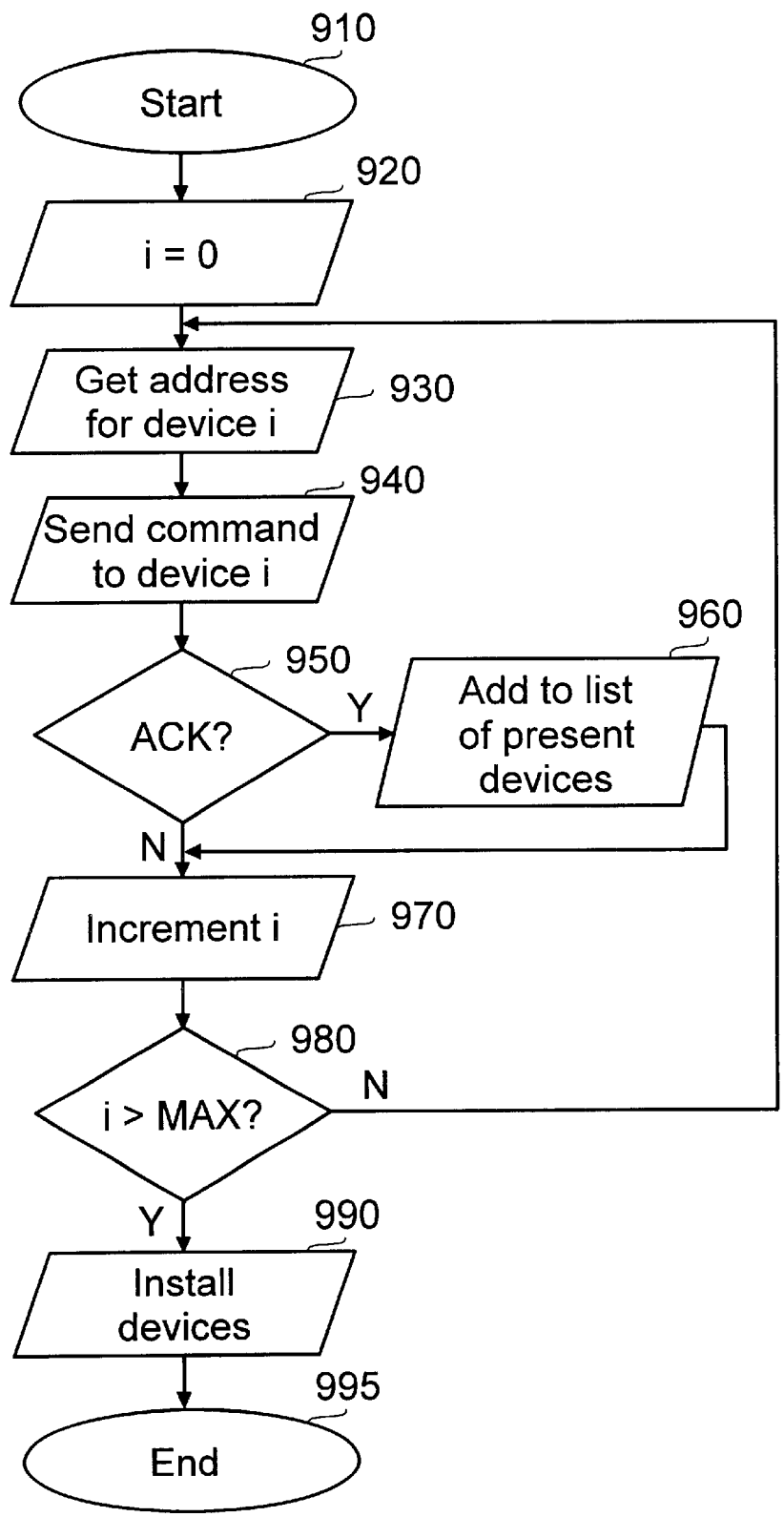
FIG. 9 shows a detailed flowchart of a device identification procedure in accordance with an embodiment of the invention.

FIG. 9 shows a flowchart showing an exemplary function of an embodiment of the invention in greater detail. After beginning in step 910, a counter is initialized in step 920, and then in step 930 an address from a list of addresses corresponding to slave unit types that can be present on the bus is obtained.

In step 940, a command is sent onto the bus using the address obtained in step 930. The command can be a dummy command, a power up command, or any other command that will elicit an acknowledge signal from any slave unit present on the bus that is of the type indicated or represented by the address. If an acknowledge is received, then in step 960 the slave unit type is added to a list that indicates types of slave units that are present on the bus.

In step 970, after the command has been sent and after, for example, either a predetermined period of time has elapsed or an acknowledge signal has been received, the counter is incremented in step 970 and then tested in step 980 to determine whether a predetermined number of different addresses have been used to send commands with. The predetermined number can be, for example, a number of slave unit types that must be present on the bus in order for the device incorporating the bus and the slave units to properly function. Alternatively, the predetermined number can be, for example, the total number of different slave unit types represented by corresponding software drivers that are stored in the secondary memory.

If in step 980 the counter equals the predetermined number, then in step 990 software drivers corresponding to the slave units present on the bus are loaded and used to initialize the slave units, and thereafter the device incorporating the bus and the slave units begins other functions in accordance with its intended purpose. If in step 980 the counter is less than the predetermined number, then control returns to step 930, and the cycle described above repeats.

Various alternatives can be employed in keeping with the spirit of the invention. For example, software drivers can be loaded and slave units can be initialized as each new slave unit type present on the bus is detected. Furthermore, in accordance with the I²C specification, various controllers or other "master" devices can be included within the device and connected to the bus, and can work together or separately to determine the character of slave units or other units connected to the bus that require software drivers and/or initialization, and perform necessary initialization procedures and subsequently issue appropriate commands to the units connected to the bus. Furthermore, the detection and initialization cycle can be run as part of a power up sequence for the device, and/or can be periodically performed while the device is powered up so that "hot changeovers", i.e., slave unit removals and additions performed while the device is powered up, can be detected and compensated for. In accordance with principles of the invention, various embodiments of the present invention can employ serial buses other than the I²C bus, which support individual addressing and acknowledging. Such buses can include, for example, support for a command that will elicit detailed identification information from a slave unit on the bus. In accordance with various embodiments of the invention, the contents of the secondary memory can also be updated.

It will be appreciated by those skilled in the art that the present invention can be embodied in other specific forms without departing from the spirit or essential characteristics thereof, and that the invention is not limited to the specific embodiments described herein. The presently disclosed embodiments are therefore considered in all respects to be illustrative and not restrictive. The scope of the invention is indicated by the appended claims rather than the foregoing description, and all changes that come within the meaning and range and equivalents thereof are intended to be embraced therein.

What is claimed is:

1. A electronic device, comprising:
   at least one controller;
   at least one slave unit;
   a bus connecting the at least one controller and the at least one slave unit and functioning in accordance with a protocol that supports individual addressing and acknowledging; and
   a secondary memory containing software drivers for a plurality of different types of slave units; wherein
   the at least one controller initializes each at least one slave unit by sending a query over the bus for each type of slave unit in a predetermined group of types of slave units, retrieving a corresponding software driver for each at least one slave unit that responds to the query, and performing initialization operations using the software driver; and
   the at least one controller and the at least one slave unit are connected only by the bus.

2. The device of claim 1, wherein the bus is an I$^2$C bus.

3. The device of claim 1, wherein the secondary memory is an EEPROM.

4. The device of claim 1, wherein the secondary memory is a static RAM.

5. The device of claim 1, wherein the secondary memory is connected to the bus.

6. The device of claim 1, wherein the secondary memory is directly connected to the at least one controller.

7. The device of claim 1, wherein the query is a power down command.

8. The device of claim 1, wherein the query is a dummy command.

9. The device of claim 1, wherein the bus consists of two lines.

10. The device of claim 1, wherein the bus is a serial bus.

11. A method for configuring an electronic device including at least one controller, at least one slave unit, a bus connecting the at least one controller and the at least one slave unit, and a secondary memory containing software drivers for a plurality of different types of slave units, comprising the steps of:

sending a command via the bus using an address for a type of slave unit;

receiving an acknowledge signal from a slave unit on the bus when the slave unit is of the type indicated by the address;

repeating the steps of sending and receiving using an address for a different type of slave unit;

loading a software driver from the secondary memory for each type of slave unit from which an acknowledge signal was received into a random access memory in the at least one controller; and initializing each slave unit on the bus using the loaded software drivers.

12. The method of claim 11, wherein the bus is an I$^2$C bus.

13. The method of claim 12, further comprising the step of repeating the steps of sending and receiving using an address for a different type of slave unit until all addresses corresponding to the slave unit types of the software drivers in the secondary memory have been used.

14. The method of claim 13, wherein the steps of sending, receiving, loading and initializing are performed periodically while the electronic device is powered up.

15. The method of claim 13, wherein the command requires a slave unit that is present on the bus and whose type corresponds to the address used to send the command, to send an acknowledge signal via the bus.

16. The method of claim 14, further comprising the step of purging all software drivers from the random access memory of the at least one controller that correspond to slave unit types that are no longer present on the bus.

17. The method of claim 16, wherein the command is a dummy command.

18. The method of claim 16, wherein the command is a power up command.

19. The method of claim 16, wherein the command includes an instruction requiring a slave unit that is present on the bus and whose type corresponds to the address used to send the command, to provide information that further identifies the slave unit.

20. The method of claim 16, wherein the at least one controller maintains a configuration file identifying the slave units on the bus.

21. The method of claim 11, wherein the bus consists of two lines.

22. The method of claim 11, wherein the bus is a serial bus.

23. The method of claim 11, wherein the step of repeating is performed until a predetermined number of acknowledge signals have been received.

* * * * *